Jan. 3, 1939. A. W. TONDREAU 2,142,538
FILM TREATING APPARATUS
Filed Oct. 28, 1936 2 Sheets-Sheet 1

INVENTOR
ALBERT W. TONDREAU
BY
*W C Beatty*
ATTORNEY

Jan. 3, 1939.  A. W. TONDREAU  2,142,538
FILM TREATING APPARATUS
Filed Oct. 28, 1936   2 Sheets—Sheet 2

INVENTOR
ALBERT W. TONDREAU
BY W. E. Beatty
ATTORNEY

Patented Jan. 3, 1939

2,142,538

UNITED STATES PATENT OFFICE 2,142,538

FILM TREATING APPARATUS

Albert W. Tondreau, Hollywood, Calif., assignor to Warner Bros. Pictures, Inc., New York, N. Y., a corporation of Delaware Application October 28, 1936, Serial No. 108,029

2 Claims. (Cl. 15—100)

This invention relates to film treating apparatus and has particular reference to apparatus for cleaning photographic film.

During the printing, projection, and handling of motion picture film, the film has a tendency to accumulate dirt, oil, lint, etc., on the surface thereof, which not only prevents a clear reproduction of the images or sound track on the film, but also tends to cause deterioration of the film as well.

One object of the present invention is to clean the surfaces of a motion picture film.

Another object of the invention is to permit passing the film at a relatively high speed through a cleaning apparatus without injury to the surface thereof.

The invention utilizes a loop frame adapted to guide a motion picture film through a suitable film cleaning liquid, in a series of folds or loops; preferably the emulsion surfaces of the film being adjacent each other in certain ones of the loops and the uncoated surfaces of the film being adjacent each other in certain others of the loops. Rotatable film cleaning members are provided within the various folds or loops and are adapted to be driven at a peripheral speed different from that of the film, thus causing a rubbing and cleaning action on the surface of the film.

In order to permit a relatively high speed of the film through the apparatus without excessive rubbing action of the film cleaning members during their engagement with the surface of the film, these cleaning members are preferably rotated in the same direction as the film and at a speed such that the relative velocity between the periphery thereof and the film is sufficient to thoroughly clean the film without damaging the surface thereof due to too high a relative rubbing velocity.

More particularly describing the invention, reference is had to the accompanying drawings, wherein.

Figure 1:
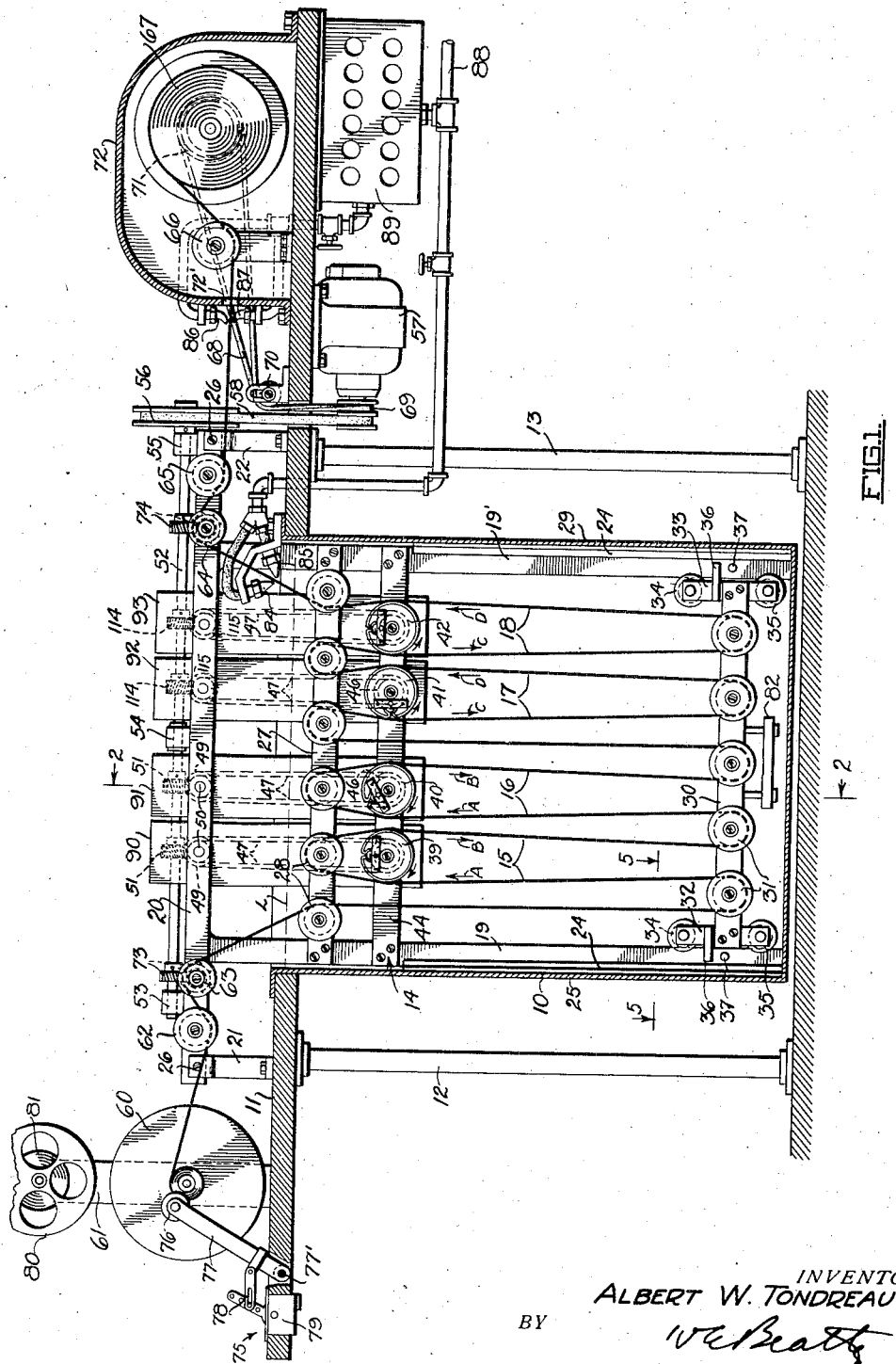
Fig. 1 is a sectional elevational view of a film cleaning apparatus embodying the present invention.
Figure 2:
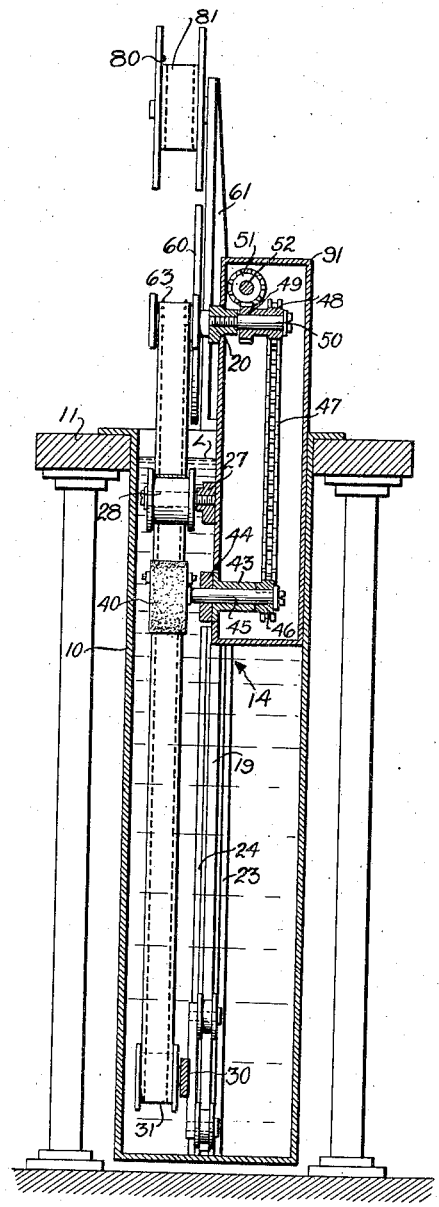
Fig. 2 is a transverse sectional view of the film cleaning apparatus and is taken along the lines 2—2 of Fig. 1.
Figure 5:
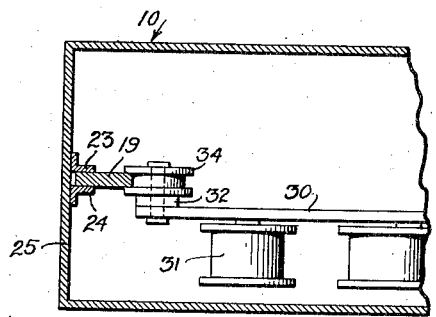
Fig. 5 is a fragmentary sectional plan view of the film cleaning tank and lower spool head, and is taken along the line 5—5 of Fig. 1.

Referring now to Figs. 1 and 2, the film cleaning apparatus comprises a rectangular tank 10, adapted to contain a film cleaning liquid, such as carbon-tetrachloride. Tank 10 is supported at its upper and open end by means of a deck 11, which in turn is supported by standards 12 and 13. A loop frame generally indicated at 14 is provided within the tank 10 to guide a motion picture film (negative or positive) to be cleaned, in a series of folds or loops as at 15, 16, 17 and 18 through the film cleaning liquid. Frame 14 comprises a pair of vertically extending guide bars 19 and 19' secured to a horizontally extending supporting bar 20. Bar 20 is removably supported on either end thereof by means of a pair of brackets 21 and 22, secured to deck 11. As shown in Fig. 5, each of the guide bars 19 and 19' is slidably secured within tank 10 by means of a pair of vertically extending angle members 23 and 24, suitably secured to the end walls 25 and 29 of the tank 10 in slidable engagement with each side of the respective guide bars. This construction permits the entire loop frame 14 to be removed from the tank 10 by removing screws 26 on brackets 21 and 22 and thence raising the frame 14 upwardly and out of the tank 10.

An upper spool head 27, having a series of spaced, laterally aligned, film guiding spools 28 freely rotatable thereon, is rigidly secured between the vertical guide bars 19 and 19'. Spool head 27 is preferably kept within the cleaning liquid, the upper level of which is indicated by the dotted lines L of Fig. 1. A lower spool head 39, also having rotatable film spools 31 in lateral alignment with each other, is provided below the upper spool head 27. Brackets 32 and 33 on either end of head 30 carry at their upper and lower ends flanged guide wheels 34 and 35, respectively. These guide wheels ride along the inner surfaces of the vertically extending guide bars 19 and 19' to permit the spool head 30 to be adjustably supported within the tank 10 in lateral alignment with the upper spool head 27. Stop members 36 provided on each of the brackets 32 and 33 are adapted to engage outwardly extending pins 37 on the respective adjacent guide bars 19 and 19' when frame 14 is being raised or when the film being cleaned breaks, thus effecting the removal of the lower spool head 30 with the rest of frame 14 when desired for cleaning, repair or threading purposes.

A series of film cleaning drums 39, 40, 41 and 42 provided within certain of the film loops, as at 15, 16, 17 and 18, respectively, are secured to shafts 45 (Fig. 2) journaled in bearings 43 which are suitably secured to a horizontally extending bar or head 44, provided between the vertical bars 18 and 19. Each of drums 39 to 42, inclusive, is maintained below the surface of the cleaning liquid.

With reference to Fig. 1 it will be noted that one surface of the film, for example the uncoated surface, will be adjacent itself in the loops 15 and 16 while the opposite surface or emulsion coated surface, will be adjacent itself in successive loops 17 and 18, thus insuring cleaning of both surfaces of the film by the respective drums 39 to 42, inclusive. Each of the various film cleaning drums 39 to 42, inclusive, is rotated in the direction of the film engaged thereby. For example, drums 39 and 40 are rotated in a clockwise direction to engage the respective folds 15 and 16 of the film traveling in the direction indicated by the arrows A and B, while the drums 41 and 42 are rotated in a counter-clockwise direction to engage the film traveling in the direction indicated by the arrows C and D.

A drive shaft 52, extending longitudinally of the cleaning apparatus is provided to impart rotation to the drums 39 to 42, inclusive, through the use of chains 47. Referring to Fig. 2 each of the various chains 47 engages at the lower end thereof a chain sprocket 46 secured to the rear end of the shaft 45 of the respective film cleaning drum.

The upper ends of chains 47 are engaged by chain sprockets 48 rotatably journaled on stud members 50 extending from the upper supporting bar 20. Spiral gears 49 are integrally formed with those two of the sprockets 48 which transmit rotation to the drums 39 and 40, and are adapted to be engaged by similar spiral gears 51 secured on the drive shaft 52. The pitch of the teeth of each of the mating pairs of gears 49 and 51, and the rotation of the shaft 52, is such as to cause rotation of the drums 39 and 40 in a clockwise direction as hereinbefore stated. The remaining chain sprockets 48 for transmitting rotation to the drums 41 and 42 are also driven by the shaft 52 through the use of mating spiral gears 114 and 115, similar to those of 49 and 51, but with the teeth thereof inclined at an opposite angle to the teeth of gears 49 and 51 to cause rotation of the drums 41 and 42 in a counter-clockwise direction.

Drive shaft 52 is journalled within bearings 53, 54, and 55, and has a driving pulley 56 secured to one end thereof. A motor 57 supported below the deck 11 drives the pulley 56 through a belt 58. Casings 90, 91, 92 and 93 are provided to enclose the driving chains and other rotating parts for driving the respective cleaning drums 39 to 42, inclusive.

A supply reel 60, adapted to support a roll of film to be cleaned, is rotatably supported on a bracket 61 carried at the upper left hand end of the deck 11. Film from reel 60 is guided under a freely rotatable film spool 62 secured to the bar 20, thence under a supply sprocket 63, also rotatably secured to bar 20. From sprocket 63, the film is guided over the various spools on the upper and lower spool heads 27 and 30, respectively, in a series of loops. The film on leaving the tank 10 passes over a take-up sprocket 64 rotatably mounted on bar 20, under a freely rotatable film guiding spool 65, under a second film guiding spool 66 and thence onto a take-up reel 67. Sprockets 63 and 64 are driven by drive shaft 52 through sets of mating spiral gears 73 and 74, respectively. The pitch of the teeth on the gear sets 73 and 74 is in such an angular direction as to cause the sprockets 63 and 64 to propel the film from left to right through the tank 10. Take-up reel 67 is also driven by motor 57 through the medium of a belt 68. Belt 68 passes around a driving pulley 69, driven by motor 57, around an idler roller 70, and thence around a driven pulley 71 suitably secured to the take-up reel 67. Preferably, a friction clutch (not shown) is provided between the reel 67 and pulley 71 to permit compensation for the change in rotational speed of reel 67 due to the changing diameter of the film roll thereon. A housing 72, having a door at one side thereof (not shown) to permit access to reel 67 and a slot 72' therein to permit entrance of the film into housing 72, is provided over the take-up reel 67 and guide roller 66 to shield the cleaned film from dust and vapor emerging from the cleaning liquid.

A certain desired ratio between the speed of the film and the peripheral speed of the cleaning drums is maintained by correctly proportioning the diameters of the film sprockets 63, 64, and the drums 39 to 42, inclusive, or by correctly proportioning the various driving gears and chain sprockets in an obvious manner. Thus any particular relative speed between the cleaning drums and the film may be maintained regardless of the speed of the film through the cleaning apparatus. However, in the present case the film is normally fed through the cleaning solution at a velocity of about 80 feet per minute and the speed of the drums 39 to 42, inclusive, is such as to maintain a velocity of about 40 feet per minute at the periphery thereof. Preferably a rheostat (not shown) is inserted in the circuit of motor 57 to vary the speed of the film through the cleaning solution as desired.

A weight 82 is provided on lower spool head 30 to apply a suitable friction between the surface of the film and the surface of the cleaning drums. By replacing weight 82 with that of a greater or less weight, the force of friction between the surface of the film and the periphery of the film cleaning drums 39 to 42, inclusive, may be changed as desired. This force of friction between the film and each or any of the film cleaning drums may also be varied by changing the diameters of the desired cleaning drums thus changing the angle of the film paths thereover which, in turn, changes the horizontal component of force introduced by the weight 82.

The film on emerging from the cleaning solution is dried by means of air blasts from nozzles 84, 85, 86 and 87. Air is fed under pressure through a conduit 88 from a suitable source of supply, such as a compressor (not shown). Nozzles 84 and 85, provided on either side of the path of the film, are directed downwardly against the surfaces of the film so as to blow a major portion of the cleaning solution remaining on the surfaces of the film, back into the tank 10. These air nozzles 84 and 85 are fed directly by the conduit 88. The other nozzles 86 and 87, situated adjacent the reel housing 72, are directed against either side of the film and are supplied with warmed air passing through an air heater 89 from the conduit 88. The warm air from nozzles 86 and 87 serves to evaporate any cleaning solution remaining on the surfaces of the film before passing onto the take-up reel 67.

An automatic motor operating switch 75 is provided in conjunction with the supply reel 60 to open the circuit of motor 57 when the film is nearly unwound from the supply reel 60. This switching arrangement comprises a roller 76 carried by an arm 77, pivoted at 77', which is secured by a suitable link arrangement 78 to a switch 79 connected in the circuit of motor 57. When the diameter of the film roll on reel 60 decreases below a certain limit the arm 77 becomes effective to operate the switch 79, and thus open the motor circuit before the end of the film leaves the reel 60 and passes into the tank 10. A second supply reel 80 is rotatably supported on bracket 61 above the supply reel 60 and is adapted to contain thereon a roll of leader film 81 which may be spliced or otherwise secured to the end of the film to be cleaned, thus maintaining the apparatus in threaded position at all times and obviating the necessity of re-threading the apparatus for each new reel of film to be cleaned.

Figures 3, 4:
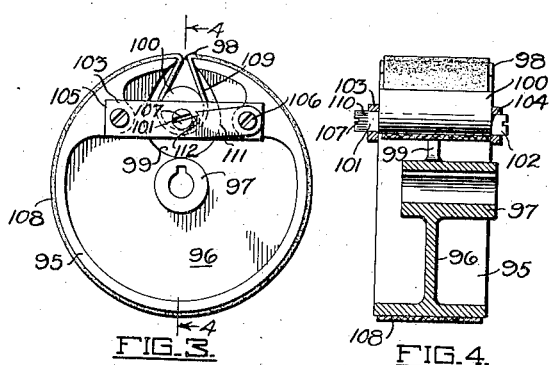
Fig. 3 is a front view of one of the film cleaning drums.
Fig. 4 is a transverse sectional view through a drum and is taken along the line 4—4 of Fig. 3.

The construction of the film cleaning drums 39 to 42, inclusive, will be understood with reference to Figs. 3 and 4, wherein each of the drums comprises an annular hub 95 having an inwardly and centrally located web 96. A central hub 97 is formed in the center of web 96 to carry the drum upon a drive shaft. Annular hub 95 has a transversely extending slot or opening 98 therein which communicates with an enlarged opening 99 in the web 96. An eccentric tensioning member 100 is provided within opening 99 and has bearing portions 101 and 102 at either end thereof journaled in bearing blocks 103 and 104. Blocks 103 and 104 are secured on either end of annular hub 95 by screws 105 and 106. Screw driver slots 107 are provided on either end of eccentric 100 to permit rotatable adjustment of the eccentric. A continuous band of film cleaning material 108 such as chamois, velvet, flannel, etc., is wrapped around the periphery of hub 95 with a looped portion 109 extending within slot 98 and around the eccentric portion of eccentric 100. Rotation of the eccentric 100 in a clockwise direction from the position shown in Fig. 3 draws the band 108 tightly upon the hub 95. In order to lock the eccentric in any desired angular position the bearing portion 101 of eccentric 100 is extended and serrated as at 110. A locking member 111 is pivotally mounted on the screw 106 and has a serrated portion 112 adapted to engage and lock the serrated portion 111 of bearing 101.

I claim:

1. An apparatus for cleaning film having an emulsion coated surface and an uncoated surface thereon comprising a tank adapted to contain a film treating solution, upper and lower spool heads adapted to guide said film through said solution in a plurality of loops, means whereby said lower spool head is adapted to be carried by the film in said loops, the coated surface of the film being in opposed adjacent relation in at least one of said loops, a drum located in said loop, the uncoated surface of the film being in opposed adjacent relation in at least one of said loops, a second drum located in said last mentioned loop, a film cleaning material on the peripheries of said drums, each of said drums being adapted to engage the adjacent surfaces of the film in the fold wherein the drum is located, means adapted to move said film through said solution and means for rotating said drums at a peripheral speed slower than the speed of said film and in the same direction as said film.

2. A film treating apparatus comprising a tank, upper and lower spool heads in said tank, a film treating element having a film treating surface thereon, means for rotatably supporting said element intermediate said upper and lower spool heads, means for traversing a film over said spool heads in a loop, the treating surface of said element lying in the path of said loop, means whereby said lower spool head is adapted to be carried by the film in said loop to create frictional contact between said film and the treating surface of said element, and means for driving said element at a peripheral speed slower than the peripheral speed of said traversing means to create a drag on said film.

ALBERT W. TONDREAU.